United States Patent
Kiscaden

[11] 3,729,929
[45] May 1, 1973

[54] FUEL CONTROL SYSTEM FOR A GAS TURBINE

[75] Inventor: Roy W. Kiscaden, Springfield, Pa.

[73] Assignee: Westinghouse Electric Corporation, Pittsburgh, Pa.

[22] Filed: Mar. 9, 1971

[21] Appl. No.: 122,427

[52] U.S. Cl. .................................................60/39.28 R
[51] Int. Cl. ..............................................F02c 9/06
[58] Field of Search...................60/39.28 T, 39.28 R, 60/39.28, 39.14

[56] References Cited

UNITED STATES PATENTS

| | | | |
|---|---|---|---|
| 2,986,880 | 6/1961 | Fortmann | 60/39.14 |
| 3,279,169 | 10/1966 | Bayard | 60/39.14 |
| 3,151,452 | 10/1964 | Bunger et al. | 60/39.14 |
| 3,151,450 | 10/1964 | Blackaby | 60/39.28 |
| 3,630,023 | 12/1971 | Lazar | 60/39.28 |
| 3,310,937 | 3/1967 | Smith | 60/39.28 |

Primary Examiner—Carlton R. Croyle
Assistant Examiner—Robert E. Garrett
Attorney—A. T. Stratton, F. P. Lyle and F. Cristiano

[57] ABSTRACT

A system for controlling the quantity of fuel supplied to the combustion chambers of a gas turbine during the ignition and operating periods, wherein a fuel signal is developed from at least one turbine operating parameter, to regulate a fuel control valve. The signal flows through a first alternate path during the ignition period and a second alternate path during the operating period. A diverting device switches the signal from the first path to the second path upon response to a predetermined level of the control signal. A limiter device is provided in the second path to maintain a minimum signal to the valve corresponding to the level required to maintain combustion.

13 Claims, 5 Drawing Figures

INVENTOR
Roy W. Kiscaden

3,729,929

FUEL CONTROL SYSTEM FOR A GAS TURBINE

BACKGROUND OF THE INVENTION

Because of the increase in peak power requirements, industrial gas turbines of the axial flow type have increased substantially in size and power output. This requires complex controls to regulate larger and heavier equipment. For example, a control system is provided to regulate the quantity of fuel supplied to the combustion chambers of the gas turbine. Large and heavy valves (for example weighing approximately 200 pounds) are used to restrict the flow of fuel to the turbine. These valves are difficult to accurately control and set, especially during the initial installation period of the valves. Furthermore, the valves add to the larger size of the turbine power plant, and there is a corresponding increase in cost associated therewith.

Generally, there is a large starting valve which is responsive to a control signal developed from turbine operating parameters, such as rotor speed, combustion chamber pressure, power output, and turbine exhaust temperature. After the initial cranking period of the gas turbine, the starting valve is used to control the amount of fuel admitted into the combustion chambers during the ignition period, until the quantity of fuel supplied reaches the minimum quantity necessary to sustain combustion. The starting valve is generally designed to give a low gain output necessary for accuracy during the starting cycle of the turbine, i.e. a large signal change would produce a smaller change in the lift or opening of the valve. This valve also functions to maintain a minimum amount of fuel supplied to the combustion chambers to support flame during a transient condition, such as from loss of load.

A second valve, such as a throttle valve, is responsive to a second control signal generated from the parameters stated above. The throttle valve controls the quantity of fuel supplied to the combustion chambers after the minimum quantity to sustain combustion is reached and continues to supply the quantity of fuel needed for the turbine to run at its full operating condition. Characteristically, the large throttle valve is inaccurate at the low flow rate levels.

It would be desirable to design a fuel control system which would eliminate the necessity of a starting valve used in the starting system and a throttle valve used in the normal operating system and to replace it with a less expensive control system which would help reduce the size of the turbine plant. It would further be more desirable to simplify the control settings on the new control system.

SUMMARY OF THE INVENTION

A system for supplying fuel to the combustion chambers of a gas turbine, providing a fuel valve, which is responsive to control signals generated during the ignition period and during the operating or running period. The signals are generated by turbine parameters, such as rotor speed, combustion chamber pressure, power output, and/or turbine outlet temperature.

After the initial low speed cranking period, a control signal or fuel scheduling signal is generated and sent through a first alternate or starting signal path to a two-position diverting device. The signal continues through the first position of the diverting device and goes through a common signal path to the valve, to activate the valve and regulate the flow of fuel.

A sensing device is connected to the common signal path. When the control signal reaches a value corresponding to the minimum level of fuel supplied to the combustion chambers to sustain combustion, the sensing device activates the diverting device to the second position. The signal is then carried to the valve through a second alternate or normal operating path, the second position of the diverting device and the common path.

A limiter device is secured to the second signal path. Once the signal goes through the normal operating path, the limiter output signal equals the control or fuel scheduling signal unless, during a transient condition, the limiter input signal or fuel scheduling signal goes below that required to sustain combustion. During such a transient condition, the limiter maintains a signal to the fuel valve at a level required to sustain flame in the combustion system. The limiter maintains this signal level until the fuel scheduling signal becomes equal to or greater than that required to sustain flame. When the fuel control signal becomes equal to or greater than that required to sustain flame, the output of the limiter equals the fuel scheduling signal, thus insuring that combustion is maintained even if radical changes in the parameter occur.

After turbine shut down, the limiter device is bypassed by switching to the starting path by the diverting device to allow a proportional control signal, which is less than that required to sustain flame, to reach the valve corresponding to the ignition period.

This fuel system thus eliminates the starting valve, reduces the overall size of the turbine plant and the costs associated therewith, and simplifies the control settings.

DETAILED DESCRIPTION OF THE PREFERRED EMBODIMENT

Figure 1:
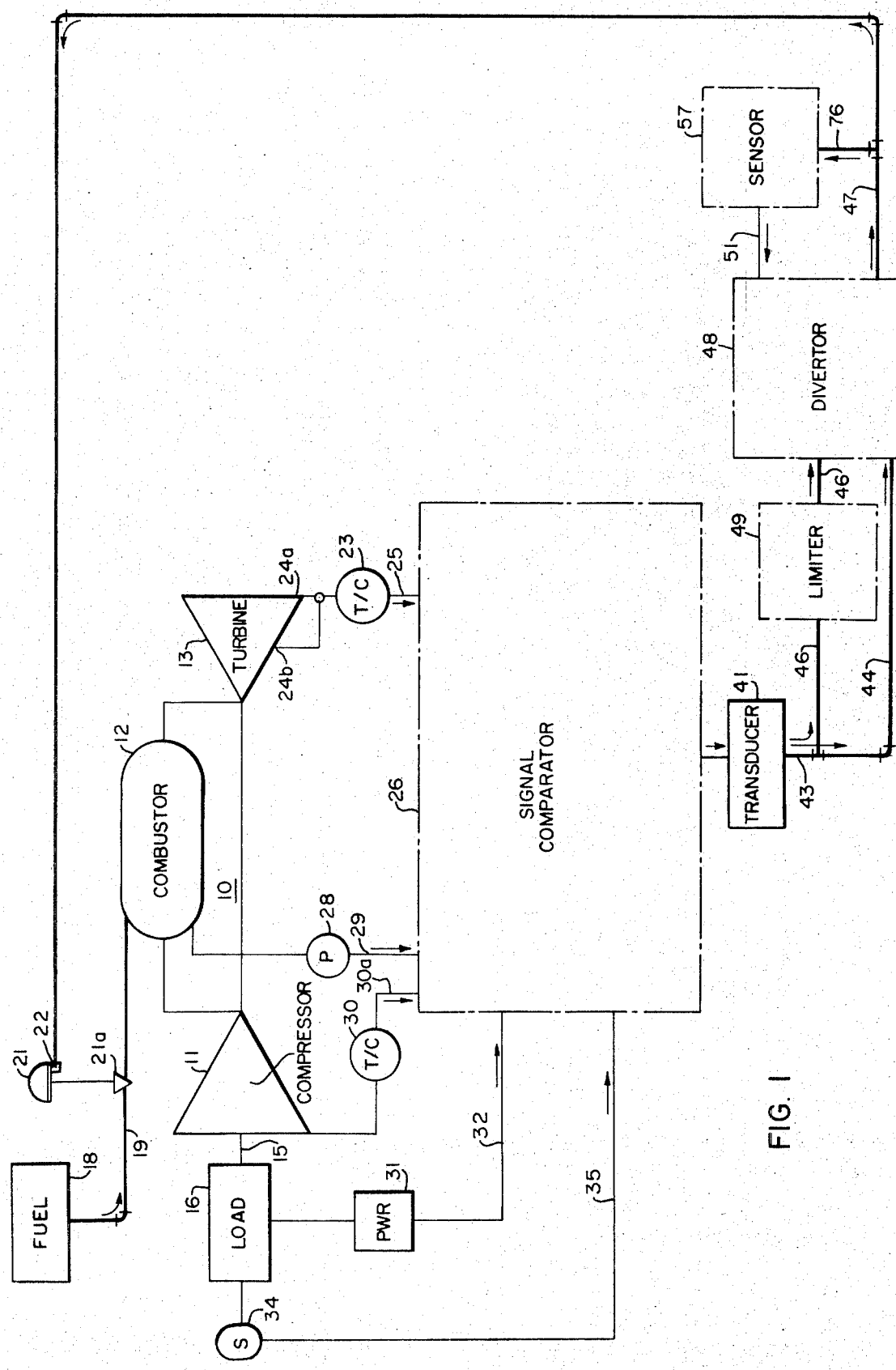
FIG. 1 is a diagrammatic representation of a fuel control system for a gas turbine incorporating the invention therein.

Referring to the drawings in detail and specifically to FIG. 1 there is shown a diagrammatic representation of a single shaft axial flow gas turbine 10. The turbine 10 includes a compressor 11, a combustion chamber or combustor 12, and a turbine 13, the turbine rotor and compressor rotors being connected by a common shaft 15, the turbine driving the compressor as well known in the art. The shaft 15 extends from the compressor 11 and is connected to a load 16, which may be a generator. A fuel reservoir 18 supplies fuel through conduit 19 to the combustion chamber 12 where it is mixed with pressurized air from the compressor 11 to form a combustible mixture, ignited and burned to produce hot gases which expand to drive the gas turbine 10.

The rate of flow of the fuel through conduit 19 to the combustion chamber 12 is regulated by a combined starting and throttle valve 21.

A plurality of signals are generated from various turbine parameters to properly determine the fuel control or fuel scheduling signal. One such signal is obtained from a thermocouple device 23 which is used to measure the average temperature of the spent gases at the turbine exhaust 24a and in the blade path 24b. The signal corresponding to the temperature of the turbine exhaust 24a and/or blade path 24b is then sent to a comparator device generally designated 26 and is one input thereto. The temperature signal is an electrical signal transmitted through line 25 although other types of signals may be used and other temperatures measured at various points.

A second input signal is extracted from the pressurized air within the combustion chamber 12. The value of the pressure is sensed by a pressure sensing device 28 which generates an electrical signal which is sent via line 29 to the comparator device 26 as a second input thereto. A third input is a temperature signal sensed by a thermocouple device 30 which measures the compressor inlet temperature and provides an electrical signal which is sent via line 30a to the comparator. A fourth input is a power signal detected by a power measuring device 31, which is connected to the load or generator 16 and generates an electrical signal proportional to the power and sent through line 32 to the comparator device 26. A fifth input signal to the comparator device is a speed signal which is measured by a speed signal generator 34. The generator 34 emits an electrical signal proportional to the rotational speed of the shaft 15 and directs it through line 35.

The five signals are fed into the comparator device 26 where the information in the signals is processed and an output signal is generated. The output signal is a continuous function of the amount of fuel required at that instant. The signal output as shown is electrical, although it is understood that either pneumatic or hydraulic signals can be used as an input and/or output thereof.

The electrical signal can then be transformed to a pneumatic or hydraulic signal by a transducer 41, if desired.

The control signal during the ignition period, flows through a first alternate or startup signal path 44 to a two-position signal diverting device 48. The signal flows through the diverting device 48 into a common path 47 and continues therethrough to the combined starting and control valve 21. The control valve 21 may have a pneumatic positioner device 22 to properly and accurately position the lift of the lifting rod or valve plug 21a of valve 21 in the sensitive, initial control positions. The valve 21 then allows the appropriate amount of fuel from reservoir 18 to flow through conduit 19 to the combustion chamber 12. It is noted that valve 21 may be any type of fuel valve which changes in response to the control signal.

Upon reaching a predetermined pressure value, a signal sensing device 57 is activated and sends an electrical signal to the diverting device 48 through line 51. The diverting device 48 is activated and blocks the flow of the signal in the first alternate or startup path 44 and allows the signal through a second alternate or normal operating path 46. A limiter device 49 is secured to the second alternate path 46. When for example, there is a larger change in the measured turbine parameters, the fuel control system tends to adjust for that change and a control signal responding to the large change in parameters is generated. If the signal to correct is below the minimum signal to maintain combustion, (may tend to over compensate) then the limiter 49 generates a minimum predetermined control signal.

Figure 2:
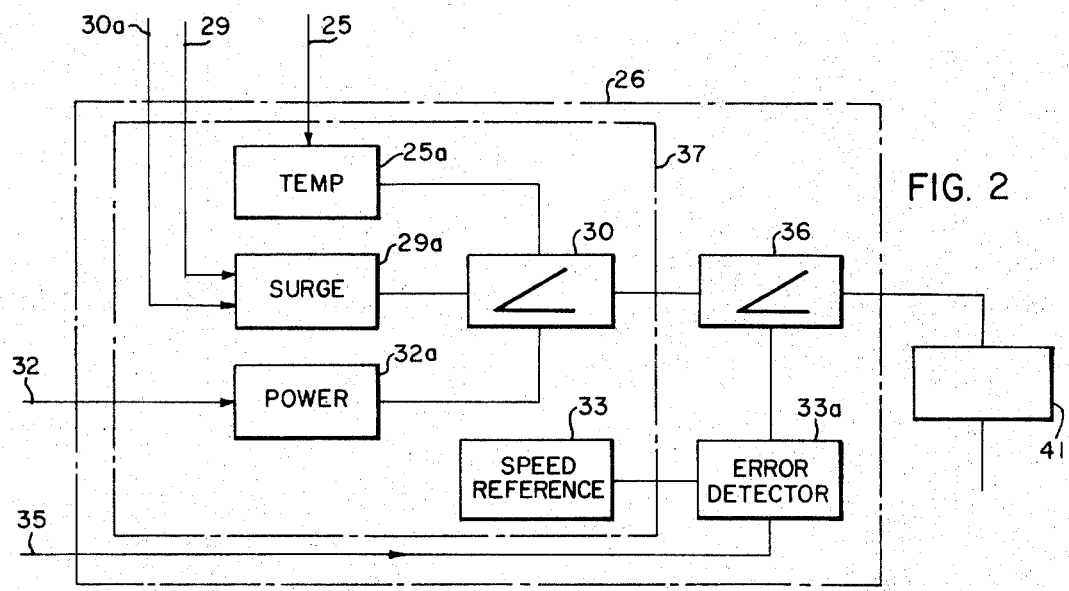
FIG. 2 is a diagrammatic representation of the signal comparing means shown in FIG. 1.

FIG. 2 diagrammatically illustrates a preferred comparator device 26. The device 26 comprises a digital computer 37 into which the temperature signal from the turbine 13 (in line 25), the pressure signal from the combustor 12 (in line 29), the temperature signal from the compressor 11 (in line 30a) and power signal from the generator 16 (in line 32) are fed. The programmed computer 37 performs a temperature limit function 25a, a surge function 29a (from the signals of the compressor inlet temperature and combustor pressure) and a power limit or control function 32a. Then a low select function 30 is performed by the programmed computer 37 to select the fuel limit signal from the temperature, surge, and power functions 25a, 29a, and 32a, respectively. The computer 37 emits a speed reference function 33 which is fed into an error detector 33a, external of the computer. The speed signal (in line 33) is also fed into the error detector 33a to determine an error speed signal, which in turn is fed into a low limit circuit 36 where it is compared with the fuel limit signal from the computer 37. The low value is selected and the fuel demand signal exits from the comparator device 26. A more detailed explanation of the comparator device 26 and parameter measurement can be found in the following copending cases:

Giras and Reuther, Ser. No. 82,470 filed Oct. 20, 1970 (Westinghouse Case No. 40,062)

Yannone and Kiscaden, Ser. No. 82,469 filed Oct. 20, 1970 (Westinghouse Case No. 42,086)

Reed and Rankin, Ser. No. 82,467 filed Oct. 20, 1970 (Westinghouse Case No. 42,477)

all assigned to the same assignee as this invention. Other types of comparator devices can be used, such as pneumatic and hydraulic, and the device may also be an analog device rather than a digital, or may be in any combination thereof.

Figure 3:
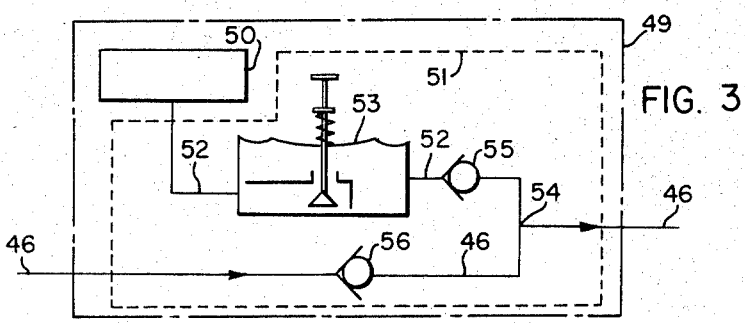
FIG. 3 is a diagrammatic representation of the limiter device shown in FIG. 1.

Referring to FIG. 3, it can be seen that the preferred limiter device 49 comprises an independent pressurized pneumatic source 50 connected to a low limit relay device 51 via conduit 52. The relay device 51 comprises a spring adjusted pressure regulator 53, for setting the minimum signal level required to sustain combustion and two check valves 55 and 56. Check valve 55 is between a jointure 54 and the pressure regulator 53 and the second check valve 56 is inserted in the normal operating path 46 before the jointure 54.

Figure 4:
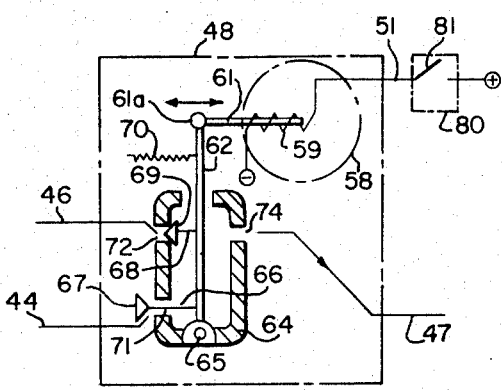
FIG. 4 is a diagrammatic representation of a signal diverting device shown in FIG. 1.

A preferred signal diverting device 48, as shown in FIG. 4, comprises a coil structure 58 creating a magnetic field within coil 59, a horizontally extending metallic rod 61 joined to one end of a vertically extending rod 62 at pivot 61a. The other end of rod 62 is secured to the base portion of housing 64 of the diverting device 48 and is pivoted thereto at pin 65. A shaft 66 extends horizontally from the bottom portion of the rod 62 and a plug 67 is secured to the end thereto, the plug being outside of the housing 64. On the middle portion of the rod 62, a second shaft 68 is secured thereto with a plug 69 on the end thereof within the housing 64. The housing 64 has an input port 71 for the startup signal path or first alternate path 44, an input port 72 for the operating path or second alternate path 46, and an output port 74. In one position, when the coil 59 is energized, the horizontal rod 61 and vertical rod 62 move from left to right, the plug 67 closes the input port 71 and plug 69 opens the input port 72. In the other position, (which is that shown in FIG. 4) the coil 59 is deenergized and a spring 70 returns the rod 61 from right to left, plug 69 closes port 72 and plug 67 opens port 71. The signal exits through output port 74 into common path 47. The divertor 48 as shown is highly diagrammatic and the ports 71, 72, 74 are sealed to prevent leakage of air.

Figure 5:
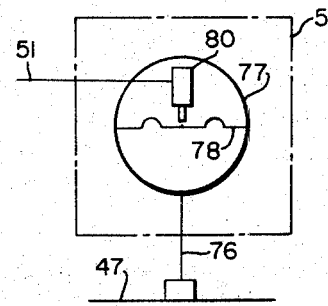
FIG. 5 is a diagrammatic showing of the sensing device shown in FIG. 1.

As shown in FIG. 1, the signal sensing device 57 is connected to the common path 47 by path 76 and is connected to the diverting device 48 by line 51. Referring to FIG. 5, it can be seen that the sensing device 57 is preferably comprised of a housing structure 77, a diaphragm structure 78 responsive to pressure in common path 47, and a position sensitive switch 80 having an open-close contact 81 (FIG. 4). When the diaphragm structure 78 engages the switch 80, the contact 81 closes allowing an electrical signal to be sent to the signal diverting device 48, thereby energizing the coil 59. Switch 80 may be any type of pressure responsive device.

The detailed operation of the control system is as follows. During the cranking period the rotor is brought up to ignition speed. Then during the ignition period, the turbine parameters previously described, are fed into the comparator 26 and an output is generated as a continuing function of the amount of fuel required. The fuel control signal in the preferred system is electrical so it is converted to a pneumatic signal in the transducer 41, and the control signal enters path 43.

During the ignition period (FIGS. 4-5), the signal in common path 47 is not of sufficient magnitude to activate the switch 80 and therefore, the diverting device 48 is not energized, so inlet port 72 is blocked and port 71 is open. The signal coming from the transducer 41 in path 43 (FIG. 1) enters the first alternate or startup signal path 44 and continues through inlet port 71 in the diverting device 48. The signal exits through the outlet port 74 into the common path 47. The control signal continues through common path 47 to activate the valve 21 (FIG. 1) to allow the proper amount of fuel to flow from the reservoir 18 in conduit 19 to the nozzle in the combustion chamber 12.

The fuel control signal flowing through path 47 increases in value during the ignition period to a predetermined level corresponding to the minimum level necessary to sustain combustion. When sufficient pressure from the pneumatic control signal is sensed by sensor 57, switch 80 is closed and coil 59 is energized. The divertor 48 switches to the second alternate or operating path 46 by causing plug 67 to close the input port 71 and correspondingly cause plug 69 to open port 72. The control signal in the first alternate signal path 44 is blocked and the signal flows through the second alternate or normal operating path 46.

As best seen in FIG. 3, the signal flows through signal path 46 in the limiter 49 and past the one way check valve 56 up to the jointure 54 and out through signal path 46. Then as best seen in FIG. 4, it goes through port 72 in diverting device 48 and into the common path 47 to the valve 21 to regulate the flow of fuel therethrough. However, a pneumatic signal from pressure source 50 (FIG. 3) enters the regulator 53, which is set to that signal level to provide a fuel flow sufficient to sustain combustion, through path 52. The signal exits from the regulator 53 and encounters the check valve 55. When the pressure from the pneumatic signal in flow path 46 is greater than the pressure in path 52, the check valve 55 remains closed and valve 56 is open. However, during conditions resulting in rapid changes in the value of one or more of the previously described operating parameters, the control signal may drop below that which is necessary to sustain a flame in the combustion chamber 12. This value is predetermined and the regulator 53 is correspondingly set, so that if the pressure in path 46 drops below that predefined value, the pressure in path 52 will be greater than the pressure in path 46. Therefore, the signal from path 52 opens check valve 55 and the signal therethrough flows into path 46, thereby sustaining the minimum level to prevent flameout. The control signal from path 52 is prevented from flowing back through line 46 by check valve 56, because of the pressure differential, and conversely, check valve 55 prevents the control signal in path 46 from flowing into the low limit relay 51.

The condition of minimal signal flow continues until the signal level returns to normal value, so that the pressure on the input of valve 56 is greater than the minimum pressure control signal on the output side thereof. When this condition occurs, check valve 55 is forced to close, the minimum pressure signal is cut off, and the signal from the normal operating parameters in signal path 46 is the control signal regulating the fuel valve.

It is noted that although a pneumatic signal is used from the transducer 41 to the combined valve 21, electric and hydraulic analogies can be made with equipment serving the same function i.e. a low limit device, a diverting device, and a level sensing device.

Once the signal is switched to the normal operating path 46 it cannot be returned to the startup path 44 under operating conditions. Of course, during turbine overhaul or shut down, the control system reverts back to its initial position.

What is disclosed then is a fuel control system which processes the turbine control parameters and generates an output fuel scheduling or control signal which is a continuous function of the amount of required fuel. During the ignition period, the control signal is sent through the startup path 44 and the diverting device 48 to regulate the fuel valve 21. Upon reaching a preset level, the sensing device 57 activates the diverting device 48 to its second position, to allow the control signal to flow through the normal operating path 46. The control signal continues therethrough and upon falling below a predetermined level, a minimum signal is generated by the limiter device to maintain a minimum supply of fuel to the combustor 12 to prevent a flameout.

Although only one embodiment has been shown it will be obvious to those skilled in the art that is not so limited, but is susceptible of various changes and modifications without departing from the spirit thereof.

What is claimed is:

1. In a gas turbine comprising at least one combustion chamber and a rotor structure, said rotor structure being rotatable at a low speed during a cranking period, at an intermediate speed during an ignition period, and at a high speed during an operating period, and a system for controlling fuel supplied to said combustion chamber, said control system comprising:

valve means for regulating the flow of fuel to said combustion chamber during said ignition and operating periods;

means responsive to at least one parameter of turbine operation for continuously determining the fuel flow required by said combustion chamber and for providing a signal representative of said fuel flow;

means for applying said signal to said valve means to effectuate operation of said valve means to regulate the flow of fuel therethrough;

said signal applying means including two alternative paths for said signal, the first of said paths being operative during said ignition period;

means responsive to the level of said signal for effecting transfer of said signal to the second path when said signal reaches a predetermined level; and means associated with said second path for maintaining a minimum signal level corresponding to the minimum fuel flow required to maintain combustion during said operating period.

2. The system recited in claim 1 wherein the second alternative path carries the control signal during the operating period.

3. The system recited in claim 1 wherein the alternative paths have a common portion and the means responsive to the signal level is connected to said common portion.

4. The system recited in claim 1 wherein the means to effect transfer of the signal to the second path comprises a signal diverting device; and the signal level responsive means activates the diverting device to divert the control signal to the second path, when the level of the signal corresponds to the operating period of the turbine.

5. The system recited in claim 1 wherein a plurality of turbine parameters are detected and converted into signals, and furthermore, means are provided to process the information in the signals and generate an output signal which is a continuous function of the fuel demanded.

6. The system recited in claim 5 wherein the signals fed into the signal processing means are electrical and the fuel demand signal exiting therefrom is electrical, means for converting said demand signal from an electrical demand signal to a pneumatic demand signal, said pneumatic signal in communication with first and second alternative signal paths.

7. The system recited in claim 1 wherein the minimum signal maintaining means comprises:

a signal regulating device providing a minimum low level signal to maintain combustion;

a low limit signal path;

a first one way signal blocking device secured to said low limit path;

a second one way signal blocking device secured to the second alternate path;

said first blocking device preventing the low level signal in said low limit path from entering the second path, when the magnitude of the signal in the second path is greater than the magnitude of said low limit signal;

said second blocking device preventing the signal in the second alternate path from continuing therethrough, when the magnitude of the low limit signal is greater than the signal in the second path.

8. The system recited in claim 1 wherein the fuel control signal is an electrical signal, means for converting said electrical signal to a pneumatic signal, said signal level responding means electrically activating a signal diverting device when the pressure level of the pneumatic signal reaches a level corresponding to the operating period, to switch the pneumatic flow in the signal paths therein, from the first path to the second path.

9. In a gas turbine comprising at least one combustion chamber and a rotor structure, said rotor structure being rotatable at a low speed during a cranking period, at an intermediate speed during an ignition period, and at a high speed during an operating period, a system for controlling fuel supplied to said combustion chamber, said control system comprising:

valve means for regulating the flow of fuel to said combustion chamber during said ignition and operating periods;

means to detect the value of at least one turbine parameter and convert it into a fuel control signal which is a continuous function of the fuel demand of the turbine;

first and second alternate signal paths, having a common portion, said paths being adapted to carry said control signal to said valve means;

means for diverting said signal from said first path to said second path;

means for sensing the magnitude of said signal in said common portion, said sensing means activating said diverting mans;

means for maintaining a minimum control signal to the valve to insure that the valve structure remains open to supply fuel to the combustion chamber at least at the minimum quantity needed to sustain combustion during the operating period;

said minimum control signal maintaining means being associated with the second signal path.

10. The system recited in claim 9 wherein the sensing means activates the diverting means, when the magnitude of the demand signal reaches a level corresponding to the operating period, to switch the signal from the first path to the second path, so that the first path carries the control signal during the ignition period and the second path carries the control signal during the operating period.

11. The system recited in claim 9 wherein the minimum control signal means provides a predetermined minimum signal into the second path when the control signal falls below the value of the minimum signal.

12. The system recited in claim 9 wherein the minimum control signal means comprises:

a signal regulating device providing a minimum low level signal to prevent turbine flameout;

a low limit path connecting said device to the second alternate path;

a first one way signal blocking device secured to said low limit path;

a second one way signal blocking device secured to the second alternate path;

said first blocking device preventing the low level signal in said low limit path from entering the second path, when the magnitude of the signal in the second path is greater than the magnitude of said low limit signal, said second blocking device preventing the signal in the second alternate path from continuing therethrough, when the magnitude of the low limit signal is greater than the signal in the second path.

13. The system recited in claim 12 wherein the minimum control signal means comprises a pneumatic system, wherein the signal regulating device provides a predetermined pneumatic signal, the low limit path carries the pneumatic signal to the second alternate path, the second alternate path carries a pneumatic signal, and said first and second blocking devices are one-way check valves which block the respective signals when the pressure from the signal in the respective path is less than the pressure in the corresponding path.

* * * * *